United States Patent
Lin

(10) Patent No.: US 6,909,991 B2
(45) Date of Patent: Jun. 21, 2005

(54) CONSOLE DISPLAY FOR PERSONAL COMPUTERS

(76) Inventor: Jen-Cheng Lin, 9Fl., No. 786, Chung-Cheng Rd., Chung-Ho City, Taipei Hsien (TW)

( * ) Notice: Subject to any disclaimer, the term of this patent is extended or adjusted under 35 U.S.C. 154(b) by 105 days.

(21) Appl. No.: 10/660,293

(22) Filed: Sep. 11, 2003

(65) Prior Publication Data

US 2005/0060106 A1 Mar. 17, 2005

(51) Int. Cl.[7] .............................................. G06F 11/30
(52) U.S. Cl. ...................................... 702/183; 702/182
(58) Field of Search ........................ 340/5.32; 361/600, 361/601, 627, 636; 374/100; 700/174, 175, 176, 177, 178; 702/57, 64, 127, 130, 132, 142, 145, 182, 183, 184, 185

(56) References Cited

U.S. PATENT DOCUMENTS 5,351,176 A  *  9/1994  Smith et al. ................. 361/681
5,920,264 A  *  7/1999  Kim et al. ................... 340/584
5,930,736 A  *  7/1999  Miller et al. ................ 702/127
6,054,823 A  *  4/2000  Collings et al. ............. 318/439

FOREIGN PATENT DOCUMENTS

EP              687977 A2 *  12/1995   ........... G06F/11/32

* cited by examiner

Primary Examiner—John Barlow
Assistant Examiner—Douglas N Washburn
(74) Attorney, Agent, or Firm—Alan D. Kamrath; Nikolai & Mersereau, P.A.

(57) ABSTRACT

A console display for personal computers is disclosed. The display device is installed at the back of a face panel on a host computer, comprising a dial meter and a signal detection circuit, wherein the output of the signal detection circuit is connected to the dial meter and the input is connected to a specific hardware component inside the host computer to receive signal outputs from specific hardware components. The signals from specific hardware components are analyzed to determine the magnitude of the signals. The output from the signal detection circuit is then used to drive the dial meter of the display device, so that the computer user is able to monitor the operation conditions of critical components for early signs of developing hardware failures.

7 Claims, 7 Drawing Sheets

CONSOLE DISPLAY FOR PERSONAL COMPUTERS

BACKGROUND OF THE INVENTION

1. Field of the Invention

The present invention relates to a console display for personal computers, especially to a display device installable on a personal computer to track the operation conditions of critical components by displaying related operation data through a display window on the face panel of the computer.

2. Description of Related Arts

To cope with increased sophistication in our daily life, more and more people have to rely on personal computers to support their regular business functions. A personal computer is generally constructed with an input unit, a main processing unit, and a display unit. However, for novice users with no adequate knowledge of the operating principles and the hardware, computers are not that friendly at all, and have been known to exasperate many users.

Analyzing the common hardware problems, failure of the cooling fans or overheating of the central processors (CPU) are among the most frequently encountered by computer users. The operating conditions of these hardware components cannot be easily monitored when the computer is in operation because these components are usually installed inside the casing. In fact, it is almost impossible, even for an experienced user with a technical background, to predict any hardware problems before the component actually fails. For a computerized operation system, such a failure could be quite costly, in terms of the potential data lost, the system down time, and the hardware replacement costs.

One of the ways to prevent the above-mentioned hardware failures is to install a console display on the face panel of the computer, such that the computer user can track the operation conditions of critical components through a display window on a continuous basis, and detect any early signs of any developing hardware problems and take precautionary actions for emergencies in advance of actual hardware failures.

SUMMARY OF THE INVENTION

The main object of the present invention is to provide a console display for personal computers, which is installable on a personal computer to provide users with continuous information with regard to the operation status of critical components in the computer, such that the user can identify early signs of any developing hardware problems, and take precautionary actions for emergencies or shut down the system for a maintenance check.

To this end, the present invention makes use of a display console installable on the face panel of the host computer, with a signal detection circuit and a dial meter, to track the operation data values of critical components in the host computer, wherein the signal detection circuit is connected to a specific hardware component in the host computer for retrieving operation data, and the operation data values are displayed through a dial meter installed on the face panel of the host computer.

The specific hardware component in the host computer connectable to the console display, in accordance with the present invention, can be a cooling fan. In this case, the signal detection circuit becomes a revolutaion count circuit connected in between the cooling fan and the dial meter, to check the revolution per minute (rpm) of the fan and output the operation data values to the dial meter, such that the computer user is able to track the operation status of the cooling fan.

The specific hardware component in the host computer connectable to the console display, in accordance with the present invention, can also be a sound controller or a sound card. In that case the signal detection circuit is an output amplitude signal detection circuit connected to the line output of the sound controller or sound card to check the magnitude of the output signal and then output a drive signal to the dial meter for displaying the magnitude of the output signal, such that the computer user is able to track the operation status of the sound controller or sound card.

The specific hardware component in the host computer connectable to the console display, in accordance with the present invention, can also be a central processor. In that case, the signal detection circuit is connected to a temperature detection circuit located in close proximity to the central processor. The operating temperature of the central processor will be continuously recorded by the temperature detection circuit and output to the dial meter for displaying the temperature values to the computer user, such that the computer user is able to track the operating temperature and the operation status of the central processor.

Through the console display, the computer user can be aware of the operation statuses of critical hardware components in the host computer. The selection of target components is based on an analysis of the probability of failure for critical components in the host computer. The continuous tracking of the operation of critical components allows the computer user to avoid any abnormal situations that could lead to hardware failures and so take precautionary actions in advance. The console display installable on the face panel of a personal computer not only provides the practical functions as mentioned above, but also adds to the decorative effect on the face panel of the computer.

The features and structure of the present invention will be more clearly understood when taken in conjunction with the accompanying figures.

DETAILED DESCRIPTION OF THE PREFERRED EMBODIMENT

The present invention provides a console display installable on the face panel of a personal computer to track the operation status of specific hardware components inside the host computer by displaying the metered operation data values through a display window.

Figure 1:
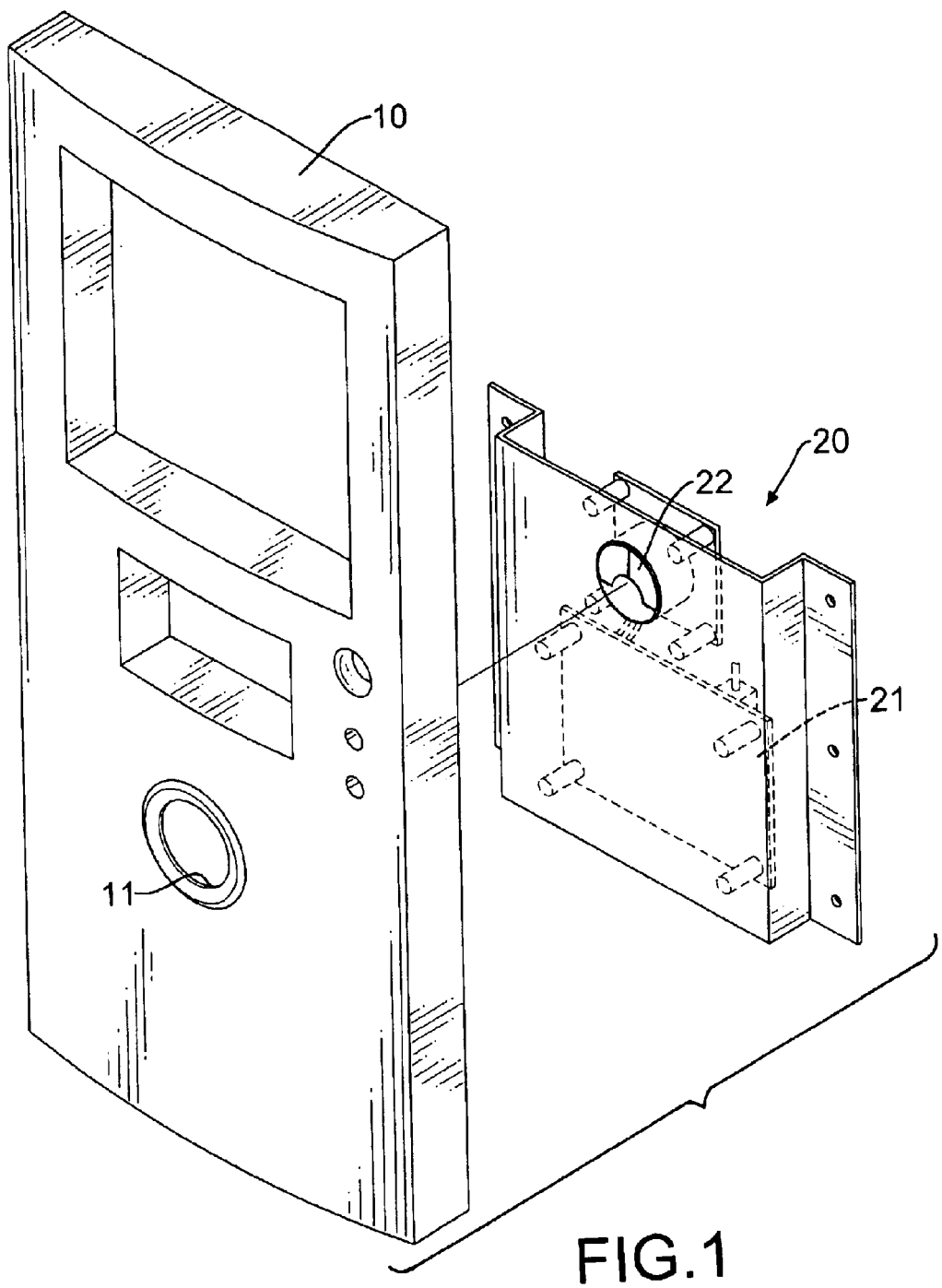
FIG. 1 is an exploded view of the present invention.
Figure 2:
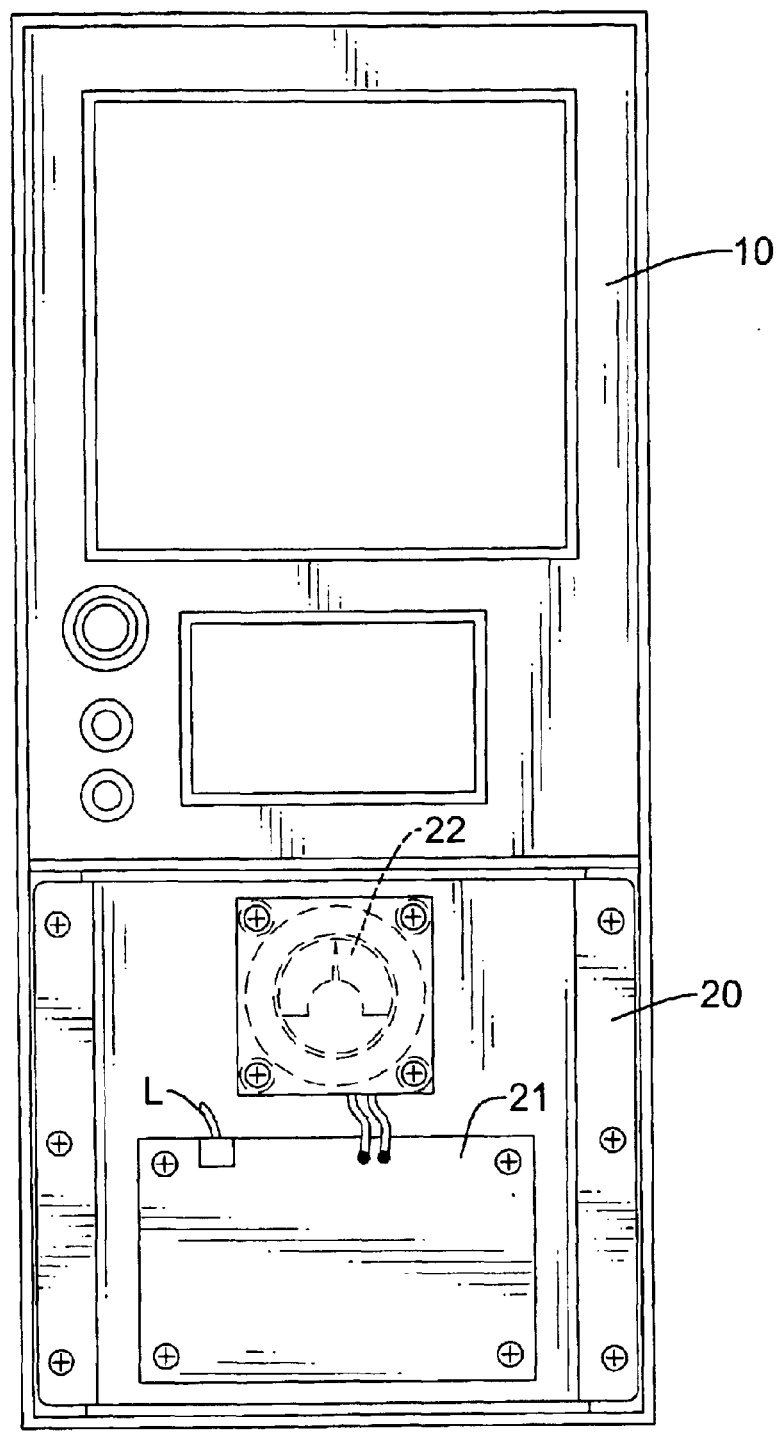
FIG. 2 is a rear view of the present invention from the back of the face panel.

The structure of the present invention is shown in FIGS. 1 and 2. The console display is a display device (20) installable on the back side of a face panel (10) in a host computer making connection with specific hardware components in the host computer. There is a display window (11) on the face panel (10) of the host computer for displaying the metered operation data values The display device (20) comprises:

a signal detection circuit (not shown in the diagrams) being set up on a circuit board (21) with an L point connected to a specific hardware component to retrieve the operation status of the hardware component;

a dial indicator (22) being connected to the output of the signal detection circuit to display the metered operation data values through a display window (11) on the face panel (10) reflecting the operation status of a specific hardware component; and a power circuit (23) being installed on a circuit board (21), which converts the input power to an appropriate voltage to supply the operation requirements of the signal detection circuit and the dial indicator (22). The power circuit, as shown in FIG. 3, includes a voltage divider with R1/R2 structure, to provide operating voltages (V1, V2) to the signal detection circuit and the dial indicator (22).

Figure 3:
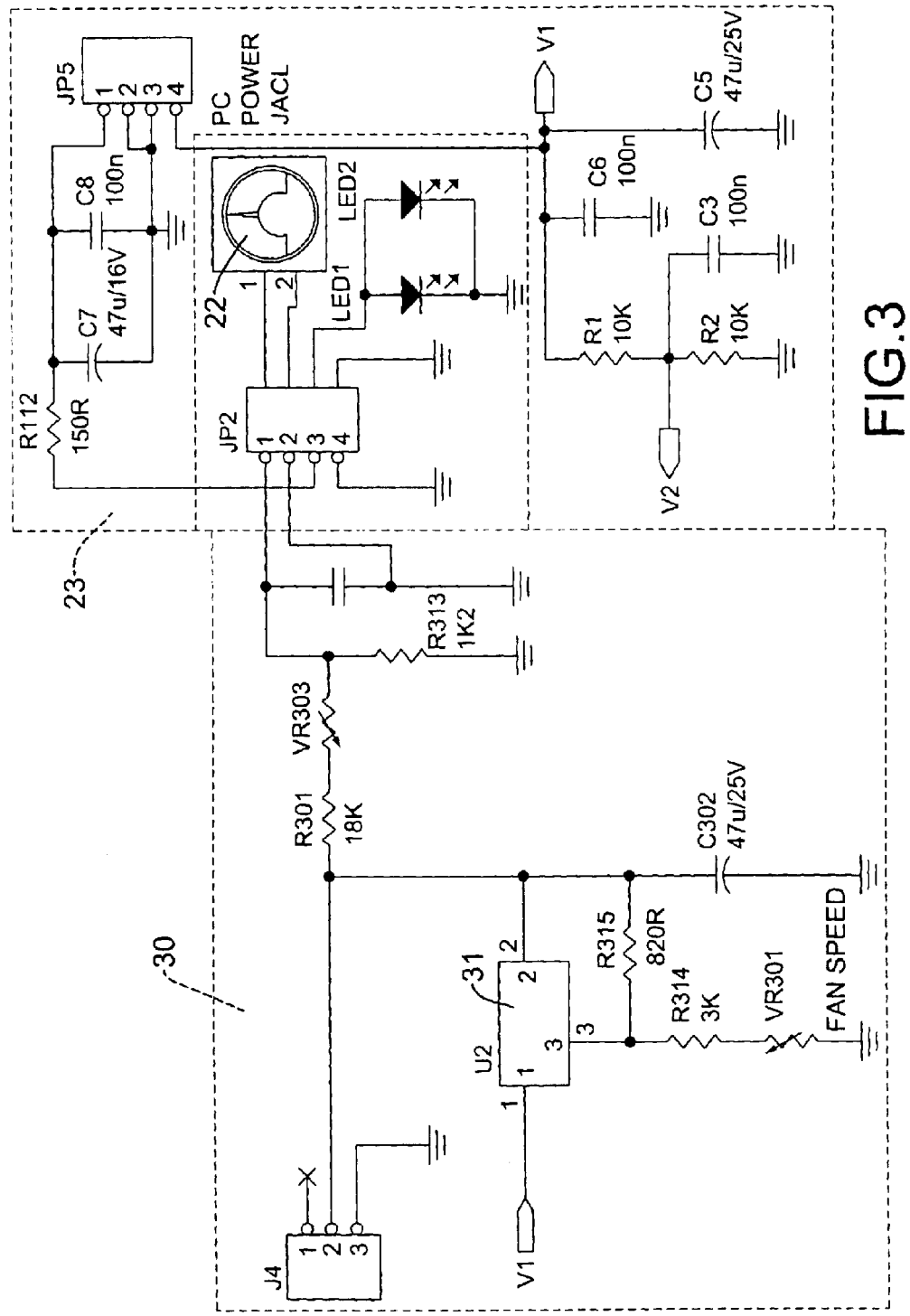
FIG. 3 is a schematic of the revolution count circuit.

The circuit diagram of the display device shown in FIG. 3 is used to track the rpm of the cooling fan, wherein the related signal detection circuit is a revolution counting circuit (30) formed by a variable voltage regulator (31). The reference voltage pin 3 of the variable voltage regulator (31) is grounded through a variable resistor VR301, used for changing voltage values. The input pin 1 of the variable voltage regulator (31) is connected to the output of the power circuit V1. The output pin 2 of the variable voltage regulator (31) is respectively connected to the power input and the input of the dial indicator (22) to track the variations in output voltage of the cooling fan, so as to determine the rpm of the cooling fan and output the metered operation data values to the dial indicator (22), reflecting the continuous operating status of the cooling fan.

Figure 4A:
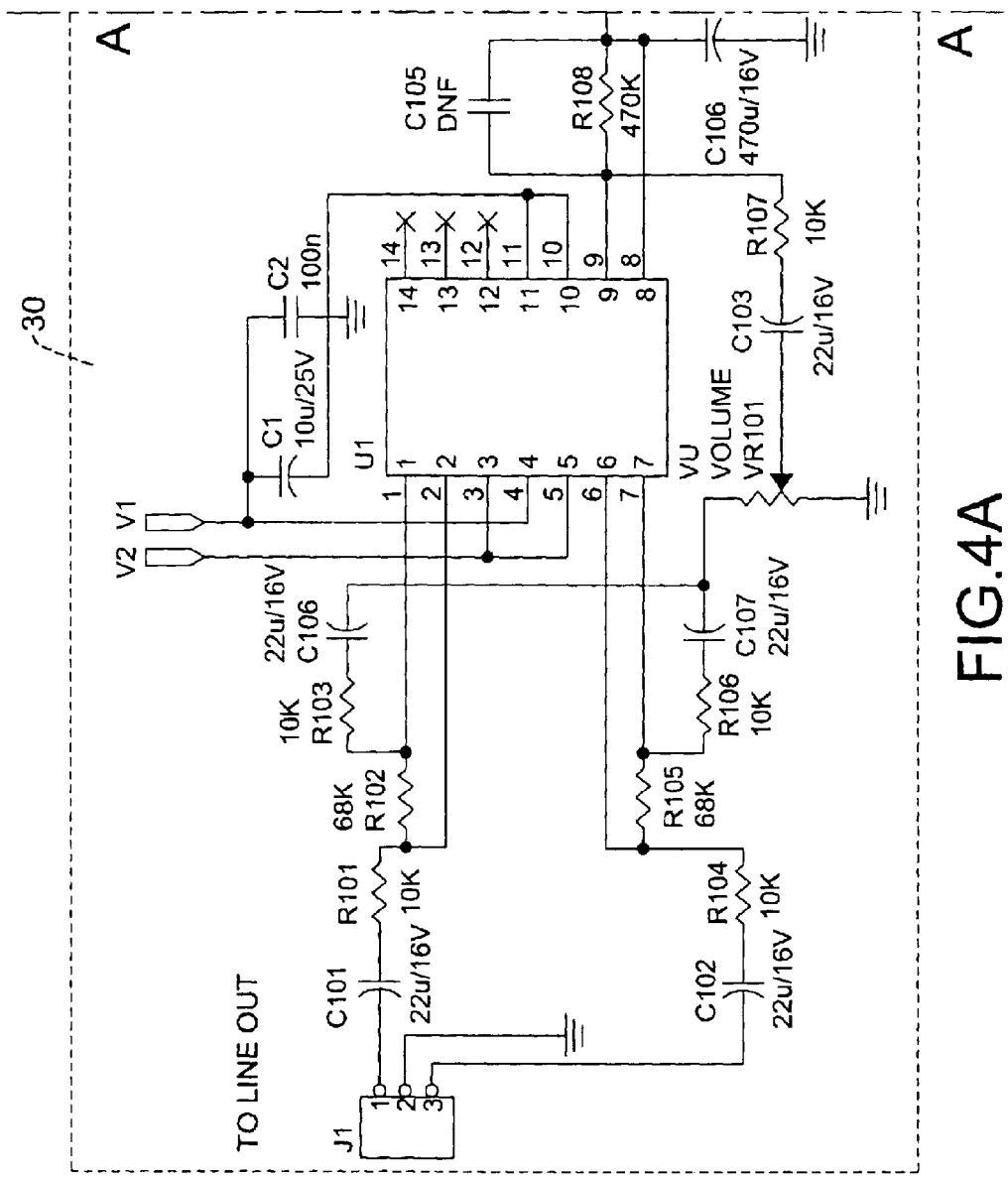
FIGS. 4A–4B are a schematic of the audio signal detection circuit.
Figure 4B:
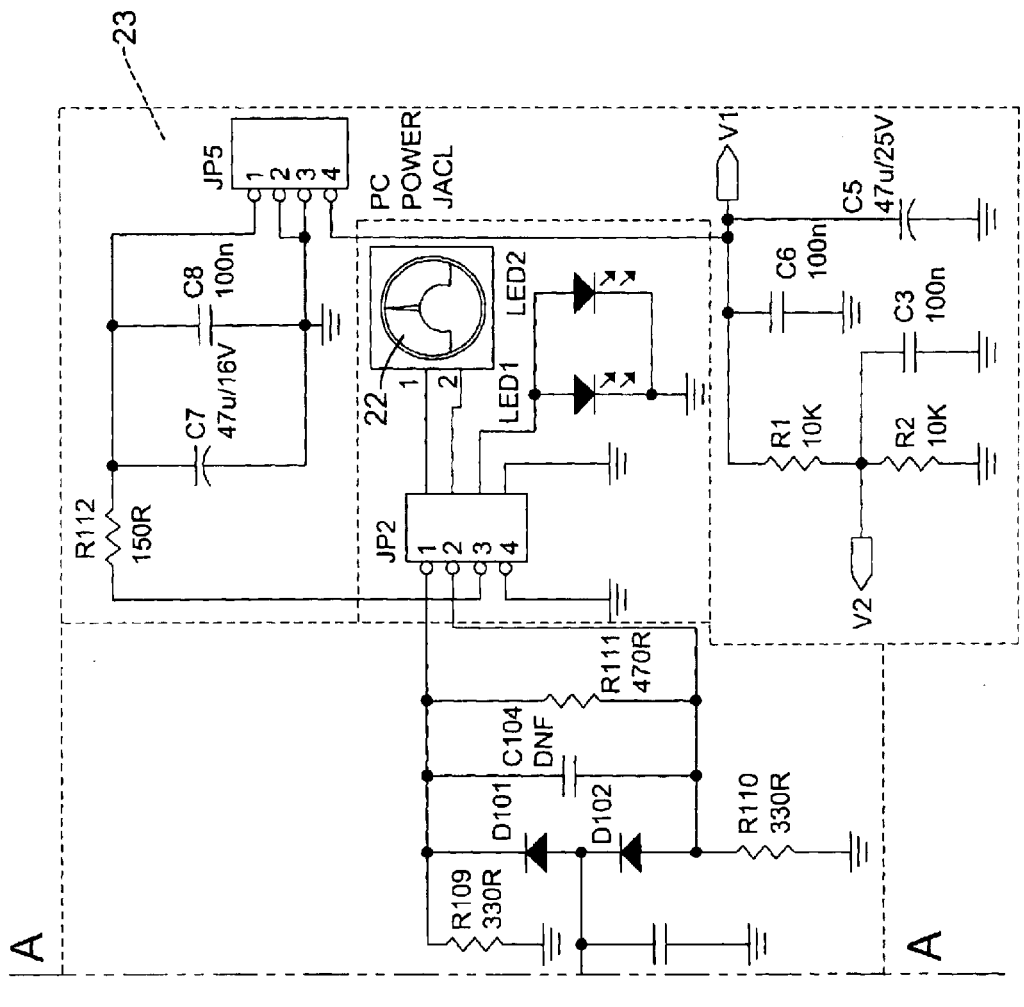

The circuit diagram of the display device as shown in FIGS. 4A–4B is used for tracking the output amplitude of a sound controller or sound card, wherein the related signal detection circuit is formed by an audio signal detection circuit (40) with a signal processor U1, which is connected in between the line out of the sound controller or the sound card and the dial indicator (22). The signal processor U1 is able to check the amplitude of the output audio signal to determine the magnitude of the output sound, and output the metered operation value to the dial indicator (22), reflecting the continuous operating status of the sound controller or sound card.

Figure 5:
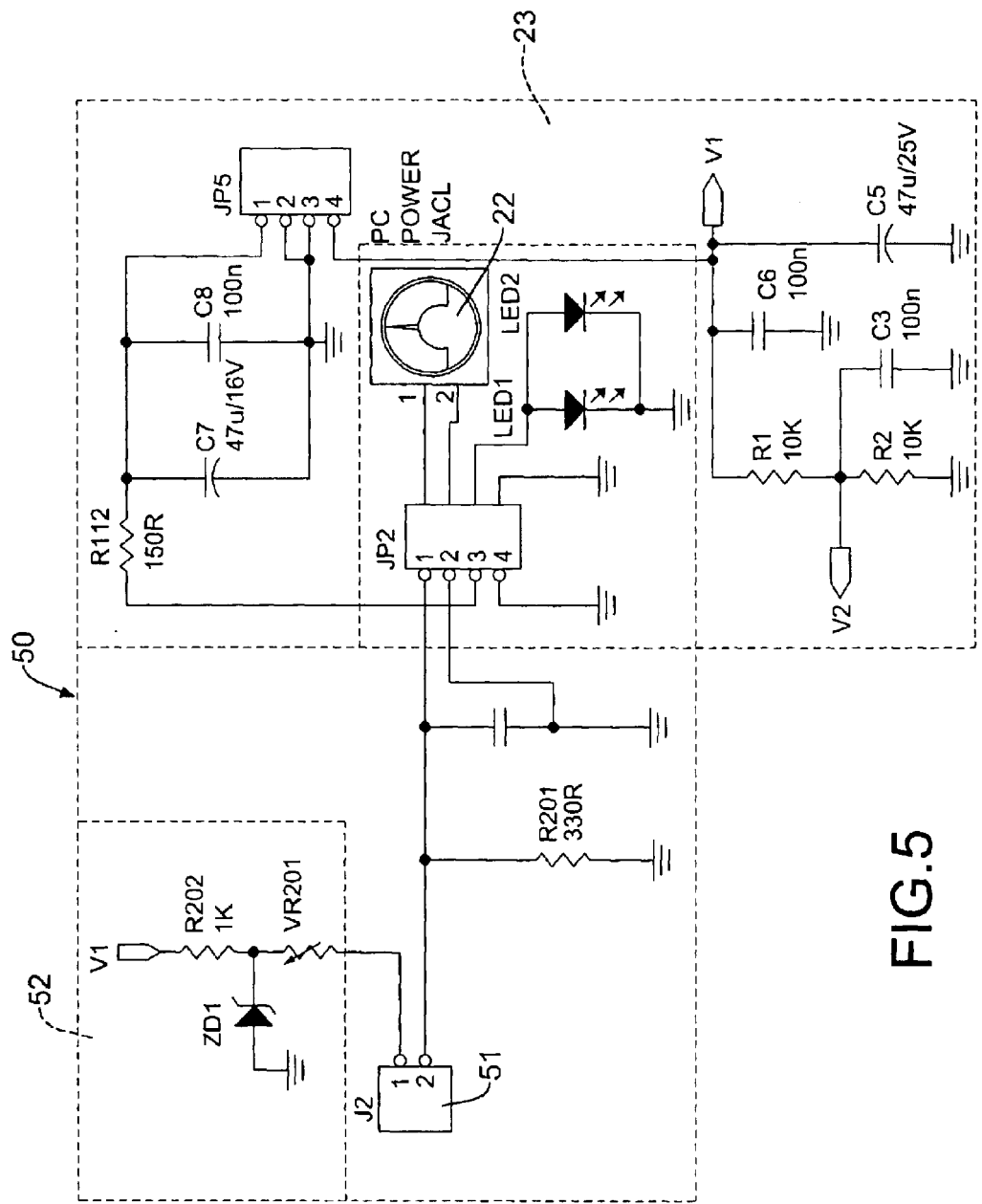
FIG. 5 is a schematic of the temperature detection circuit.

The circuit diagram of the display device shown in FIG. 5 is used for tracking the operating temperature on the surface of the central processor. The related signal detection circuit is a temperature detection circuit (50), including:

a temperature detector (51) to detect variations in the surface temperature of the central processor and output a drive signal to the dial indicator (22), wherein the temperature detector (51) can be installed at a location in close proximity to the central processor; and a voltage regulator (52) to provide operating voltage to the temperature detection circuit (50), wherein the voltage regulator (52) is connected in between the power circuit (23) and the temperature detector (51), formed by a resistor R202, a variable resistor VR201, and a Zener diode ZD1.

In accordance with the present invention, the output of the above mentioned voltage regulator (52) is grounded through a resistor R201 and connected to the dial indicator (22), to detect the variations in voltage and output drive signals to the dial indicator (22), reflecting the continuous operating temperature recorded by the temperature detector (51).

Figure 6:
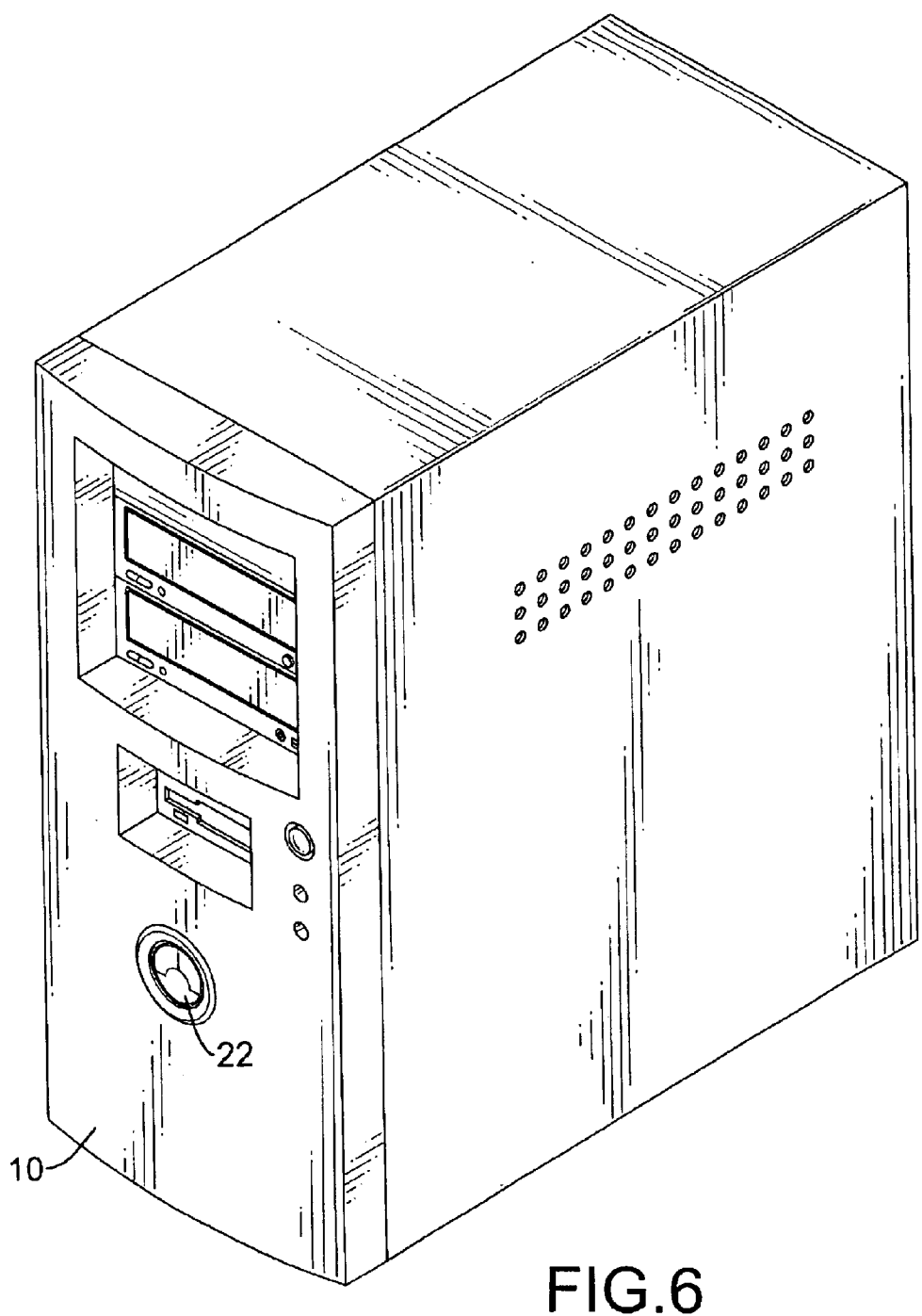
FIG. 6 is an example of the present installation in a personal computer.

From the foregoing, the present invention can be implemented with several types of signal detection circuits as mentioned above to check the operation status of specific hardware components inside the host computer, and the metered operation data values can be displayed to the computer user on a continuous basis through a display window on the face panel of the host computer, as shown in FIG. 6, such that the computer user is able to monitor the operating status of critical components and identify early signs of any developing hardware problems. For users possessing a hardware background, this information can be useful for taking precautionary actions for emergencies or shutting down the computer for a maintenance check. For users without a hardware background, this information offers a learning experience in working with the personal computer. Furthermore, the addition of a display window on the face panel of the personal computer not only provides the practical values mentioned above but also adds to the decorative effect on the face panel of the personal computer.

The foregoing description of the preferred embodiments of the present invention is intended to be illustrative only and, under no circumstances, should the scope of the present invention be so restricted.

What is claimed is:

1. A console display for a host personal computer, comprising:

a signal detection circuit being installed on a circuit board, wherein the signal detection circuit is connected to a specific hardware component in the host computer to continuously retrieve the operation status of the component;

a dial meter being installed at a back of a face panel that has a display window on a front surface, wherein the dial meter is connected to an output of the signal detection circuit to display operation data value retrieved from the hardware component; and a power circuit also being installed on the circuit board, wherein the power circuit is used to convert the input power to an appropriate operating voltage for the signal detection circuit and the dial meter.

2. The console display as claimed in claim 1, wherein the signal detection circuit incorporates a revolution count circuit formed by a variable voltage regulator, whereby the reference voltage input to the variable voltage regulator is grounded through a variable resistor for changing voltage values, and another input is connected to the output of the power circuit, and the output of the variable voltage regulator is respectively connected to the power input of a cooling fan and the input of the dial meter, such that the variations in voltage output can be used to determine the rpm of the cooling fan and output a drive signal to the dial meter.

3. The console display as claimed in claim 1, wherein the signal detection circuit incorporates an audio output detection circuit, which is formed by a signal processor connected in between the line output of the sound controller or sound card and the dial meter to retrieve the output audio signal and output a drive signal to the dial meter.

4. The console display as claimed in claim 1, wherein the signal detection circuit incorporates a temperature detection circuit, which is formed by:

a temperature detector installable in close proximity to the central processor with the output connected to the dial meter for displaying continuous temperature values; and a voltage regulator installable between the power circuit and the temperature detection circuit to supply the operating voltage for the temperature detection circuit.

5. The console display as claimed in claim 4, wherein the voltage regulator is formed by a resistor, a variable resistor, and a Zener diode.

6. The console display as claimed in claim 5, wherein the output of the voltage regulator is connected to the dial indicator through a grounded resistor.

7. The console display as claimed in claim 1, wherein the power circuit is formed by a voltage divider.

* * * * *